(12) United States Patent
Hehlen

(10) Patent No.: US 10,989,450 B1
(45) Date of Patent: Apr. 27, 2021

(54) SOLID-STATE OPTICAL REFRIGERATOR FOR CRYOGENIC COOLING OF PAYLOADS

(71) Applicant: LOS ALAMOS NATIONAL SECURITY, LLC, Los Alamos, NM (US)

(72) Inventor: Markus Peter Hehlen, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 334 days.

(21) Appl. No.: 15/636,615

(22) Filed: Jun. 28, 2017

Related U.S. Application Data

(60) Provisional application No. 62/361,908, filed on Jul. 13, 2016.

(51) Int. Cl.
| | | |
|---|---|---|
| *F25B 23/00* | (2006.01) | |
| *H01S 3/02* | (2006.01) | |
| *H01S 3/16* | (2006.01) | |

(52) U.S. Cl.
CPC ............ *F25B 23/003* (2013.01); *H01S 3/025* (2013.01); *H01S 3/1618* (2013.01); *H01S 3/1653* (2013.01)

(58) Field of Classification Search
CPC .... F25B 23/003; H01S 3/1653; H01S 3/1618; H01S 3/025; H01S 3/0405
USPC .......................................................... 62/310
See application file for complete search history.

(56) References Cited

U.S. PATENT DOCUMENTS

| | | | | | |
|---|---|---|---|---|---|
| 3,409,843 | A | * | 11/1968 | Bowness | ............... H01S 3/1066 372/19 |
| 3,901,738 | A | * | 8/1975 | Hunsperger | ............ H01L 31/00 372/46.015 |
| 3,946,331 | A | * | 3/1976 | Pollack | ................... H01S 3/093 372/70 |

(Continued)

OTHER PUBLICATIONS

Anupum Pant, Xiaojing Xia, E. James Davis and Peter J. Pauzauskie; Solid-state laser refrigeration of a composite semiconductor Yb:YLiF4 optomechanical resonator, Jun. 23, 2020; Nature Communications vol. 11, Article No. 3235 (2020) (Year: 2020).*

(Continued)

*Primary Examiner* — Paul Alvare
*Assistant Examiner* — Kirstin U Oswald
(74) *Attorney, Agent, or Firm* — Lewis Roca Rothgerber Christie LLP

(57) ABSTRACT

A solid-state optical refrigerator for cryogenic cooling of a payload, the solid-state optical refrigerator including a laser cooling crystal including a first material and a dopant material; a thermal link including a second material, the thermal link being bonded to the laser cooling crystal and the thermal link being configured to be thermally linked to the payload to transfer heat conductively from the payload to the laser cooling crystal via the thermal link; and a vacuum chamber housing the laser cooling crystal and the thermal link, the vacuum chamber and thermal link having a combination of shape and coating such that laser and fluorescence light reflected off a wall of the vacuum chamber and laser and fluorescence light propagating within the thermal link are not incident on the payload.

20 Claims, 9 Drawing Sheets
(1 of 9 Drawing Sheet(s) Filed in Color)

(56) References Cited

U.S. PATENT DOCUMENTS

| | | | | |
|---|---|---|---|---|
| 3,970,960 | A * | 7/1976 | Mollenauer | H01S 3/042 372/42 |
| 4,471,003 | A * | 9/1984 | Cann | C01B 33/037 136/258 |
| 4,697,271 | A * | 9/1987 | Amano | H01S 3/0606 372/68 |
| 4,839,009 | A * | 6/1989 | Pollock | H01S 3/1681 204/157.41 |
| 4,974,230 | A * | 11/1990 | Hemmati | H01S 3/09415 372/41 |
| 5,280,492 | A * | 1/1994 | Krupke | C30B 15/00 372/41 |
| 5,447,032 | A * | 9/1995 | Epstein | F25B 23/003 62/3.1 |
| 5,615,558 | A * | 4/1997 | Cornell | F25B 23/003 62/264 |
| 5,982,792 | A * | 11/1999 | Kasamatsu | H01S 3/042 372/34 |
| 6,041,610 | A * | 3/2000 | Edwards | F25B 23/00 62/264 |
| 6,195,372 | B1 * | 2/2001 | Brown | H01S 3/042 372/34 |
| 6,469,825 | B1 * | 10/2002 | Digonnet | C03C 3/062 359/341.5 |
| 6,694,080 | B2 * | 2/2004 | Dejneka | H01S 3/06754 359/341.1 |
| 6,760,351 | B1 * | 7/2004 | Riley | H01S 3/042 372/34 |
| 7,110,174 | B2 * | 9/2006 | Dane | B23K 26/032 359/423 |
| 8,720,219 | B1 * | 5/2014 | Sheik-Bahae | H01S 3/0408 62/264 |
| 9,209,598 | B1 * | 12/2015 | Reagan | H01S 3/0604 |
| 9,310,167 | B1 * | 4/2016 | Farmer | H01S 3/0007 |
| 9,362,712 | B1 * | 6/2016 | Sheik-Bahae | H01S 3/13 |
| 9,574,801 | B1 * | 2/2017 | Seletskiy | F25B 23/00 |
| 2002/0063361 | A1 * | 5/2002 | Fahey | B23K 26/0624 264/400 |
| 2003/0147443 | A1 * | 8/2003 | Backus | H01S 3/235 372/70 |
| 2005/0226287 | A1 * | 10/2005 | Shah | H01S 3/0057 372/25 |
| 2006/0280221 | A1 * | 12/2006 | Seitel | H01S 3/08 372/100 |
| 2007/0084992 | A1 * | 4/2007 | Hammig | F25B 23/003 250/251 |
| 2007/0201532 | A1 * | 8/2007 | Zhang | H01S 3/081 372/93 |
| 2007/0205364 | A1 * | 9/2007 | Ouvrier-Buffet | G01J 5/04 250/338.1 |
| 2008/0117362 | A1 * | 5/2008 | Wolk | G02F 1/133603 349/69 |
| 2009/0059766 | A1 * | 3/2009 | Yamada | G02B 26/101 369/112.01 |
| 2010/0040105 | A1 * | 2/2010 | Rocca | H05G 2/001 372/75 |
| 2012/0312028 | A1 * | 12/2012 | Kashyap | F25B 23/00 62/3.1 |
| 2015/0075181 | A1 * | 3/2015 | Epstein | F25B 23/003 62/3.1 |
| 2015/0303641 | A1 * | 10/2015 | Hill | H01S 3/0912 372/35 |

OTHER PUBLICATIONS

G. Symonds et al., "Thermal Management and Design for Optical Refrigeration," Proc. SPIE9765, Optical and Electronic Cooling of Solids, 97650N, Mar. 23, 2016, from Conference vol. 9765, 7 pages.

Markus P. Hehlen et al., "Design Study of a Laser-Cooled Infrared Sensor," Proc. SPIE 9380, Laser Refrigeration of Solids VIII, .938001, Mar. 10, 2015, from Conference vol. 9380, 15 pages.

John Parker et al., "Thermal Links for the Implementation of an Optical Refrigerator," HMC Faculty Scholarship @ Claremont, Journal of Applied Physics 105(1), 013116, Jan. 14, 2009, 13 pages.

* cited by examiner

US 10,989,450 B1

SOLID-STATE OPTICAL REFRIGERATOR FOR CRYOGENIC COOLING OF PAYLOADS

CROSS-REFERENCE TO RELATED APPLICATION(S)

The present application claims priority to and the benefit of U.S. Provisional Application No. 62/361,908, filed Jul. 13, 2016, entitled "SOLID-STATE OPTICAL REFRIGERATOR FOR CRYOGENIC COOLING OF PAYLOADS", the entire content of which is incorporated herein by reference.

STATEMENT REGARDING FEDERALLY SPONSORED RESEARCH OR DEVELOPMENT

The United States government has rights in this invention pursuant to Contract No. DE-AC52-06NA25396 between the United States Department of Energy and Los Alamos National Security, LLC for the operation of Los Alamos National Laboratory.

BACKGROUND

1. Field

Embodiments of the present invention relate to optical refrigerators.

2. Description of the Related Art

Solid-state optical refrigeration is a phenomenon in which a solid (e.g., a laser cooling crystal) is excited by a laser of one wavelength and the solid, in response to the excitation, fluoresces light at a slightly shorter average wavelength. This emission process is also known as anti-Stokes fluorescence. Each excitation/emission event extracts an amount of heat from the solid that corresponds to the energy difference between the excitation and the fluoresced light (e.g., emission light), thereby cooling the solid.

SUMMARY

Aspects of embodiments of the present invention are directed to a mechanism that reliably connects a payload to the laser cooling crystal with good thermal conductivity while not absorbing fluoresced light and provide a mechanism of rigidly mounting the crystal-link-payload assembly while reducing (e.g., minimizing) parasitic heat loads. As such, embodiments of the present invention may make solid-state optical refrigeration practical for various applications.

According to embodiments of the present invention, a solid-state optical refrigerator for cryogenic cooling of a payload includes a laser cooling crystal including a first material (e.g., a host material) and a dopant material; and a thermal link including a second material, the thermal link being bonded to the laser cooling crystal and the thermal link being configured to be thermally linked to the payload to transfer heat conductively from the payload to the laser cooling crystal via the thermal link; and a vacuum chamber housing the laser cooling crystal and the thermal link, the vacuum chamber and thermal link having a combination of shape and coating such that laser and fluorescence light reflected off a wall of the vacuum chamber and laser and fluorescence light propagating within the thermal link are not incident on the payload.

The first material may include a YLiF$_4$ (YLF) host crystal, and the dopant material may include Yb$^{3+}$ ions in a concentration such that about 10% of Y$^{3+}$ ions in the YLF host crystal have been replaced with the Yb$^{3+}$ ions (YLF:Yb).

The solid-state optical refrigerator may further include aerogel pieces between the vacuum chamber and the thermal link.

The aerogel pieces may be hydrophobic.

The thermal link may be a single kink thermal link.

The single kink thermal link may have a kink angle of less than 90°.

The laser cooling crystal and the thermal link have substantially the same coefficient of thermal expansion.

The solid-state optical refrigerator may further include a magnetic mount for actively stabilizing and aligning the payload, the laser cooling crystal, the thermal link, and the magnetic mount.

The magnetic mount may include a submount; optical fibers; and magnetic pins.

According to another embodiment of the present invention, a solid-state optical refrigerator for cryogenic cooling a payload, includes a laser cooling crystal including a first material and a dopant material; and a thermal link including a second material, the thermal link being bonded to the laser cooling crystal and the thermal link being configured to be thermally linked to the payload to transfer heat conductively from the payload to the laser cooling crystal via the thermal link, the thermal link having nano-textured surfaces.

The first material may include a YLiF$_4$ (YLF) host crystal, and the dopant material may include Yb$^{3+}$ ions in a concentration such that about 10% of Y$^{3+}$ ions in the YLF host crystal have been replaced with the Yb$^{3+}$ ions (YLF:Yb).

The solid-state optical refrigerator may further include a vacuum chamber housing the laser cooling crystal and the thermal link, and aerogel pieces between the vacuum chamber and the thermal link.

The aerogel pieces may be hydrophobic.

The thermal link may be a single kink thermal link.

The single kink thermal link may have a kink angle of less than 90°.

The laser cooling crystal and the thermal link have substantially the same coefficient of thermal expansion.

The solid-state optical refrigerator may further include a magnetic mount for actively stabilizing and aligning the payload, the laser cooling crystal, the thermal link, and the magnetic mount.

The magnetic mount may include a submount; optical fibers; and magnetic pins.

According to another embodiment of the present invention, a method of cryogenically cooling a payload, the method including: providing a laser cooling crystal including a first material and a dopant material; bonding a thermal link to the laser cooling crystal, the thermal link including a second material; housing the laser cooling crystal and the thermal link in a vacuum chamber; and exciting the laser cooling crystal with laser light of a first wavelength, wherein the thermal link is thermally linked to the payload and transfers heat conductively from the payload to the laser cooling crystal, and wherein the vacuum chamber and thermal link have a combination of shape and coating such that the laser light and fluorescence light reflected off a wall of the vacuum chamber and the laser light and fluorescence light propagating within the thermal link are not incident on the payload.

The first material may include a YLiF$_4$ (YLF) host crystal. The dopant material May include Yb$^{3+}$ ions in a concentration such that about 10% of $Y^{3+}$ ions in the YLF host crystal have been replaced with the $Yb^{3+}$ ions.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Illustrative, non-limiting example embodiments will be more clearly understood from the following detailed description taken in conjunction with the accompanying drawings.

DETAILED DESCRIPTION

Solid-state optical refrigeration is a phenomenon in which a solid is excited by a laser of one wavelength and the solid, in response to the excitation, fluoresces light at a slightly shorter average wavelength. This emission process is also known as anti-Stokes fluorescence. Each excitation/emission event extracts an amount of heat from the solid that corresponds to the energy difference between the excitation and the fluoresced light, thereby cooling the solid. The solid has to be very pure so as to reduce non-radiative processes that induce unwanted heating. Some useful materials are ytterbium-doped fluoride crystals.

The crystal emits intense fluorescence which, if it reaches a payload (e.g., an infrared photo-sensor), may heat the payload. Likewise, there may be residual (e.g. unabsorbed) laser light which, if it reaches a payload, may heat the payload. Further, the crystal-link-payload assembly has to be mounted in such a way as to reduce (e.g., minimize) heat loads on the crystal-link-payload assembly and to be rigid enough to withstand operational conditions such as a rocket launch.

A thermal link between the payload (object to be cooled) and the laser cooling crystal (heat sink) may be provided to establish a thermally conductive path in order to cool the payload by the crystal. In addition, this thermal link may prevent or substantially prevent fluorescence emitted by the crystal or residual laser light from reaching and thus heating the payload, and the thermal link may not absorb the fluorescence or laser light itself.

Figure 1B:
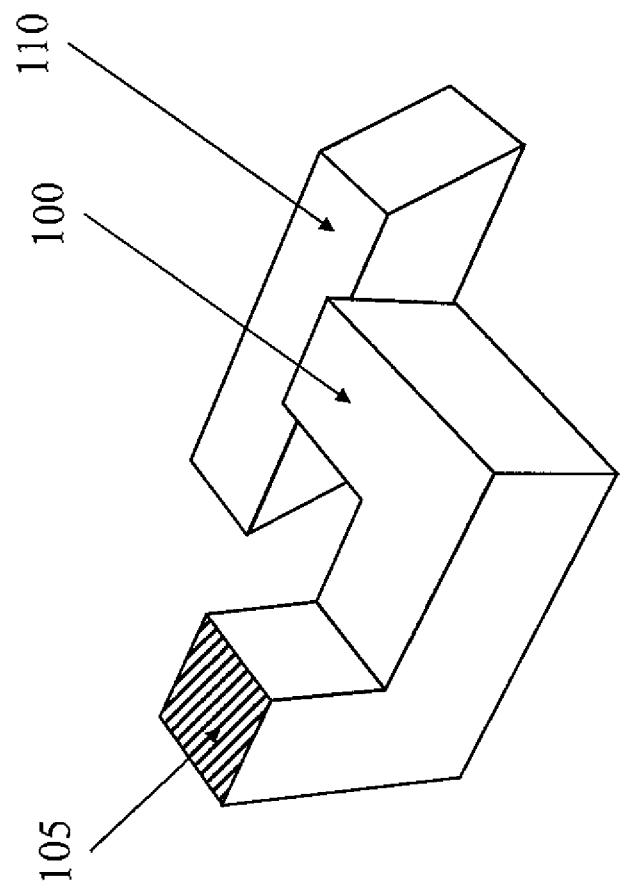
FIG. 1B is a perspective view of a double-kink sapphire thermal link diffusion-bonded to a YLF:Yb laser cooling crystal.
Figure 1A:
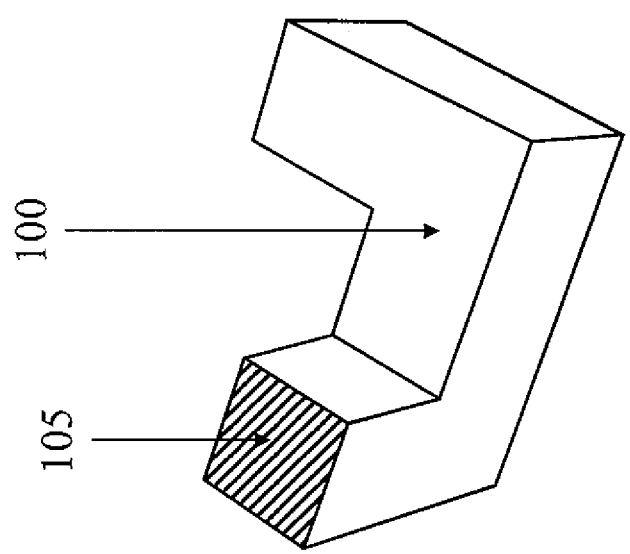
FIG. 1A is a perspective view of a double-kink sapphire thermal link with a sputtered Ag/Au mirror on the payload surface.
Figure 1C:
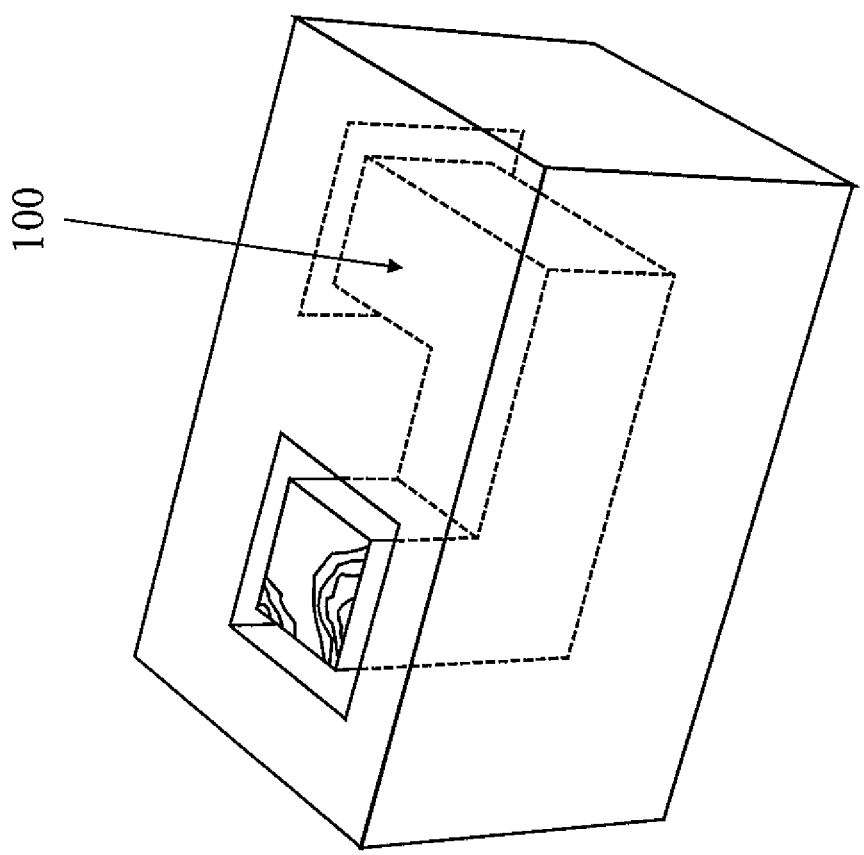
FIG. 1C is a ray-tracing analysis of a double-kink sapphire thermal link using the FRED Optical Engineering software.

FIG. 1A is a perspective view of a double-kink sapphire thermal link 100 with a sputtered Ag/Au mirror 105 on the payload surface. The Ag/Au mirror is an element that may further prevent fluorescence and laser light from reaching the payload, which may be attached such as to be in thermal contact with the outside of the Ag/Au mirror. FIG. 1B is a perspective view of a double-kink sapphire thermal link 100 diffusion-bonded to a YLF:Yb laser cooling crystal 110. FIG. 1C is a ray-tracing analysis of a sapphire thermal link 100 using the FRED Optical Engineering software.

One approach is to use a rectangular cross-section thermal link 100 (e.g., a rectangular waveguide) with two 90-degree kinks made from sapphire crystal (e.g., FIG. 1B). Kink angles other than 90 degrees may also be used. This double-kink waveguide is bonded to the laser cooling crystal 110 on one side and to the payload on the other side (e.g., FIG. 1B). The kinks may prevent a large fraction of the fluorescence emitted by the crystal from reaching the payload. Sapphire is an excellent thermal conductor and sapphire does not absorb the fluorescence (which is at near-infrared wavelengths for YLF:Yb).

In addition, the bonding between the sapphire thermal link 100 and the fluoride laser cooling crystal 110 may be made without adhesives, as adhesives may absorb fluorescence and thus generate heat. This may be accomplished by using a process of adhesive-free diffusion bonding.

While the laser cooling crystal 110 is shown as a fluoride laser cooling crystal 110 and the thermal link 100 is shown as a sapphire thermal link 100, the present invention is not limited thereto. For example, the laser cooling crystal 110 may comprise a suitable first material and a dopant material and the thermal link 100 may comprise a second material. The first and second material may be a same material or a different material.

Further, the sapphire thermal link 100 and the fluoride laser cooling crystal 110 may have different coefficients of thermal expansion. As a result, high shear stress may form at the bonding interface between the sapphire thermal link 100 and the laser cooling crystal 110 as the assembly is cooled from room temperature to cryogenic temperature, which may result in mechanical failure.

Therefore, the second material may be chosen so as to provide a thermal link 100 whose coefficient of thermal expansion is well matched to (e.g., has substantially the same coefficient of thermal expansion as) the laser cooling crystal 110, thereby reducing (e.g., minimizing) shear stress and resulting in a stronger, more reliable bond suited for relevant application environments such as space-based instruments.

Substantially the same coefficients of thermal expansion may be realized by using the same material (e.g., the host material) as the laser cooling crystal for the thermal link, however, the dopant ions may be omitted, e.g., the thermal link may be made from the "undoped" (e.g., pure) host material. The corresponding crystallographic axes in the thermal link and the laser cooling crystal may be aligned as for some crystal materials (such as YLF) the coefficients of thermal expansion (CTE) are different for different crystal axes. For example, YLF:10% Yb (laser cooling crystal) may have CTEs that are very similar to pure YLF (thermal link) when the corresponding crystallographic axes are aligned.

The crystal-link-payload assembly may be mounted inside a vacuum chamber to reduce (e.g., minimize) the convective heat load from the warmer chamber walls. Furthermore, the vacuum chamber may be made to closely fit the shape of the crystal-link-payload assembly (e.g., a clamshell) in order to reduce (e.g., minimize) the radiative heat load from the warmer chamber walls.

During the operation of the optical refrigerator, the crystal-link-payload assembly may be at a lower temperature (e.g. 100 K) than the surrounding vacuum chamber (e.g. 300 K). Therefore, heat may flow conductively through a support structure used to mechanically mount the crystal-link-payload assembly within the vacuum chamber, as the support structure is in contact with the assembly and the vacuum chamber and thus subject to a temperature gradient. Heat flowing from the warmer chamber walls through the support structure to the crystal-link-payload assembly may cause undesired heating of the payload. For example, silica optical fibers may be used to support the assembly with a small (e.g., a minimum) contact area and thus a small (e.g., a minimum) conductive heat load. Using silica optical fibers may not be mechanically rugged enough for some applications.

Embodiments of the present invention may provide ways of mounting the crystal-link-payload assembly inside the vacuum chamber with low conductive heat loads and in a manner that is mechanically rugged enough for relevant application environments such as space-based instruments.

Embodiments of the present invention may use support structures fabricated from a material with a low thermal conductivity such as silica aerogel. FIG. 2A shows a cross sectional view of a crystal-link-payload assembly mounted compressively inside a clamshell structure by means of aerogel cylinders according to an embodiment of the present invention. The crystal-link-payload assembly 200 is held within the clamshell vacuum chamber 205 by means of cylinder-shaped aerogel supports 210. Screws 215 may be used to press the aerogel cylinders against the crystal-link-payload assembly in order to mechanically align and mount it within the clamshell vacuum chamber. Additional spring loading between the screw and the aerogel support may be used.

Figure 2B:
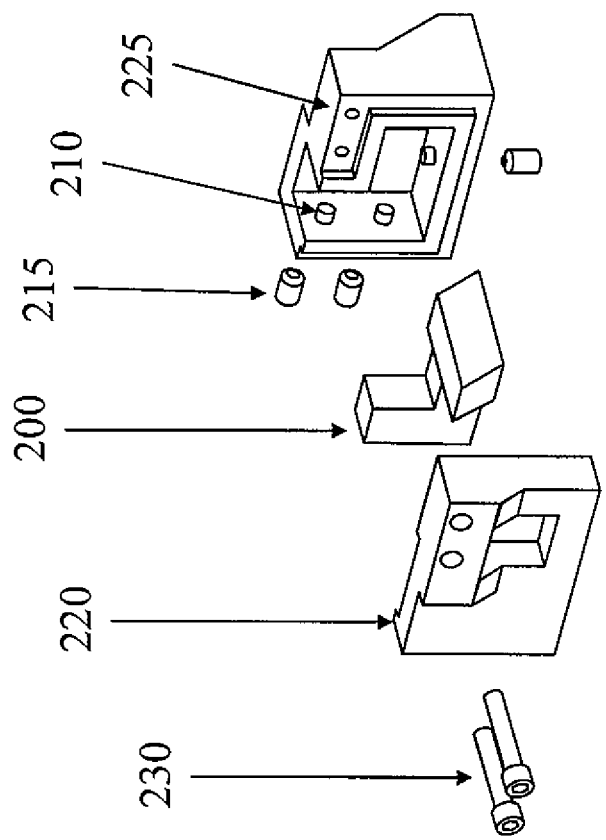
FIG. 2B is an exploded view of a crystal-link-payload assembly mounted compressively inside a clamshell structure by means of aerogel cylinders.
Figure 2A:
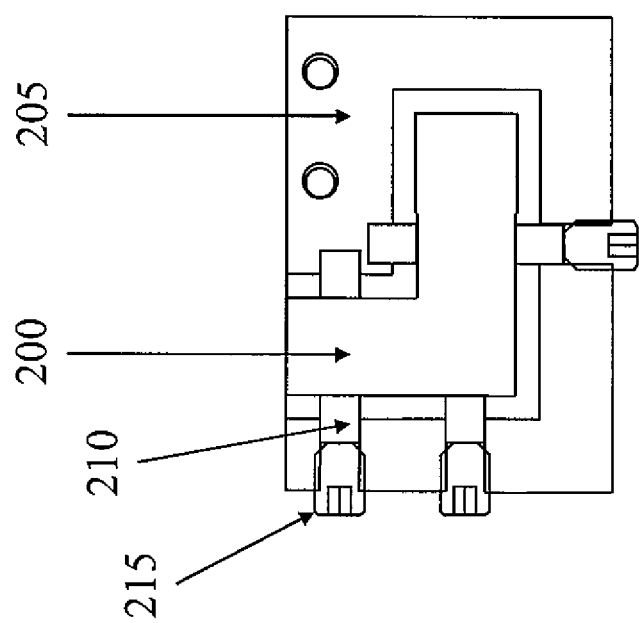
FIG. 2A is a cross-sectional view of a crystal-link-payload assembly mounted compressively inside a clamshell structure by means of aerogel cylinders.

FIG. 2B shows an exploded view a crystal-link-payload assembly mounted compressively inside a clamshell structure by means of aerogel cylinders according to an embodiment of the present invention consisting of two clamshell pieces 220 and 225 that mate in a light tight fashion when assembled using bolts 230. The use of two or more pieces for the clamshell may aid in the assembly and alignment of the optical refrigerator device.

According to FIG. 2B, the crystal-link-payload assembly 200 is held within the assembled clamshell by multiple aerogel cylinders 210 pressing against the crystal-link-payload assembly 200 from multiple directions such that the assembly is securely mounted in all three dimensions. For example, six aerogel cylinders may be used such that a pair of aerogel cylinders provides pressure against the assembly 200 along each of the x, y, and z directions.

Aerogel may be hydrophilic (having a tendency to mix with, dissolve in, or be wetted by water) or hydrophobic (tending to repel or fail to mix with water). Some embodiments of the present invention use hydrophobic aerogel in order to reduce the absorption of water during assembly.

Figure 3B:
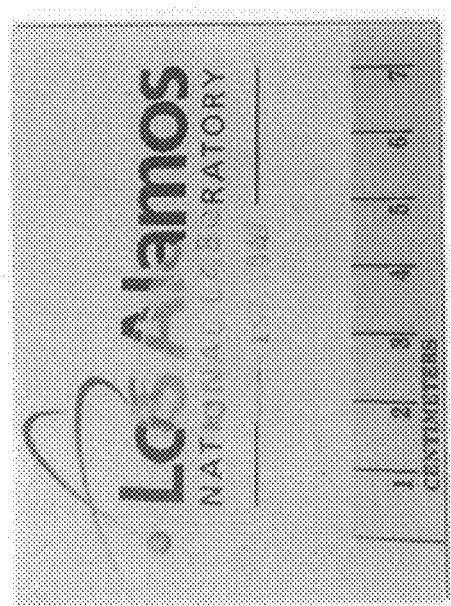
FIG. 3B is an image of an approximately 1 in$^3$ bulk silica aerogel sample.
Figure 3A:
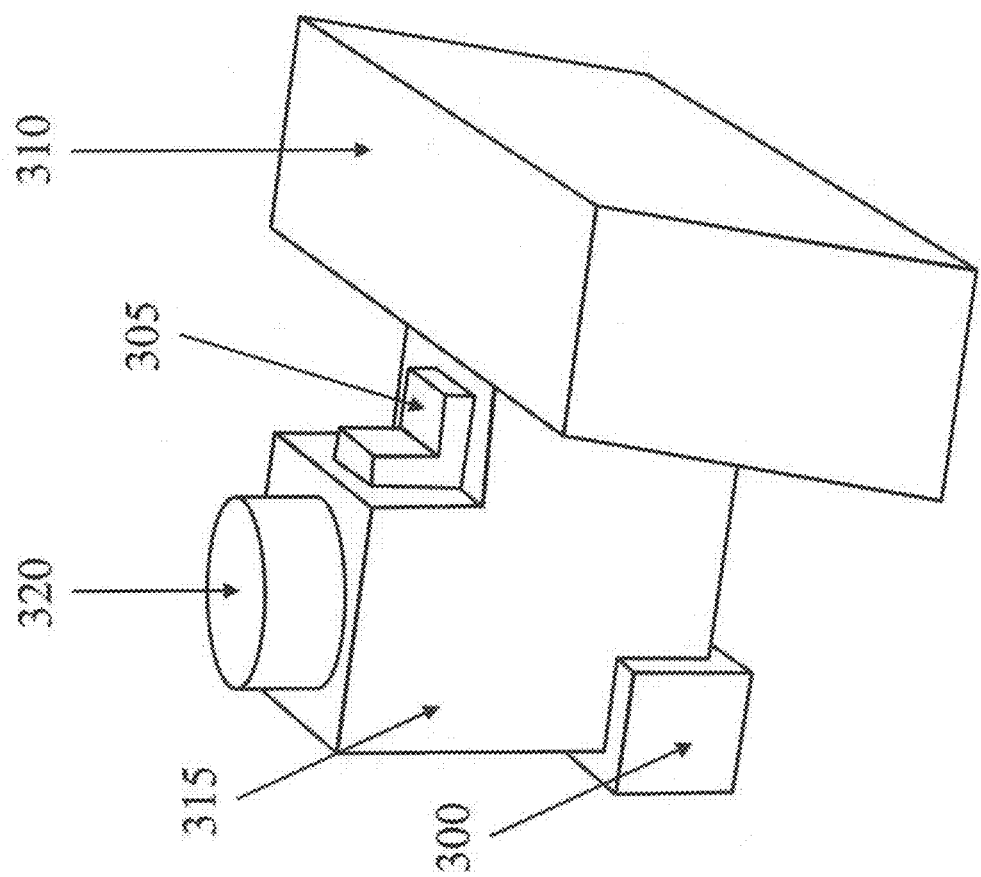
FIG. 3A is a three-dimensional view of a crystal-link-payload assembly mounted by means of aerogel corner and aerogel edge support structures.

FIG. 3A is a three-dimensional view of a crystal-link-payload assembly mounted by means of aerogel corner and aerogel edge support structures. While a six-point aerogel support structure is described above, the present invention is not limited thereto. For example, FIG. 3A shows a three-point aerogel support structure according to the present invention that uses a combination of aerogel corner supports 300 and aerogel edge supports 305 to mount the assembly consisting of laser-cooling crystal 310, thermal link 315, and payload 320 within the clamshell vacuum chamber.

Aerogels are solid foam-like materials with exceptionally low thermal conductivity on the order of 0.008-0.017 W/(K·m) in air and 0.004 W/(K·m) in vacuum, and they may be mechanically rugged when used in compression.

FIG. 3B is an image of an approximately 1 in$^3$ bulk silica aerogel sample (translucent object placed over the LANL logo) with a density of about 0.195 g cm$^{-3}$ (e.g., 0.195 g cm$^{-3}$) according to an embodiment of the present invention. The thermal and mechanical properties of aerogels are in part determined by the aerogel density, which can be tuned over a wide range during the synthesis of the aerogel material. Embodiments of the present invention may use different aerogel densities such as to achieve an optimum compromise between high mechanical ruggedness (favoring a high aerogel density) and low thermal conductivity (favoring a low aerogel density) as dictated by the specific requirements of an application.

Referring back to FIG. 2B, some embodiments of the present invention may use aerogel pieces (e.g., a six-point aerogel support along the x, y, and z axes) to provide alignment and support to the crystal-link-payload assembly inside the vacuum chamber. This mounting may be mechanically rugged, and yet it may have a conductive heat load of only ~10 mW, which is small compared to a typical laser-cooler heat lift of 300-500 mW achieved when operating a YLF:Yb crystal at 100 K with a 50 W laser. Compared to the alternate mechanism of simply gravitationally supporting the assembly with silica optical fibers, a six-point aerogel mounting may be significantly more rugged in all directions while performing similarly well in terms of thermal properties.

According to other embodiments of the present invention, materials other than aerogels may be used to provide support of the crystal-link-payload assembly within the vacuum chamber. For example, some embodiments of xerogels or holey fibers may provide sufficiently low thermal conductivity while having sufficiently high mechanical ruggedness.

Figure 4B:
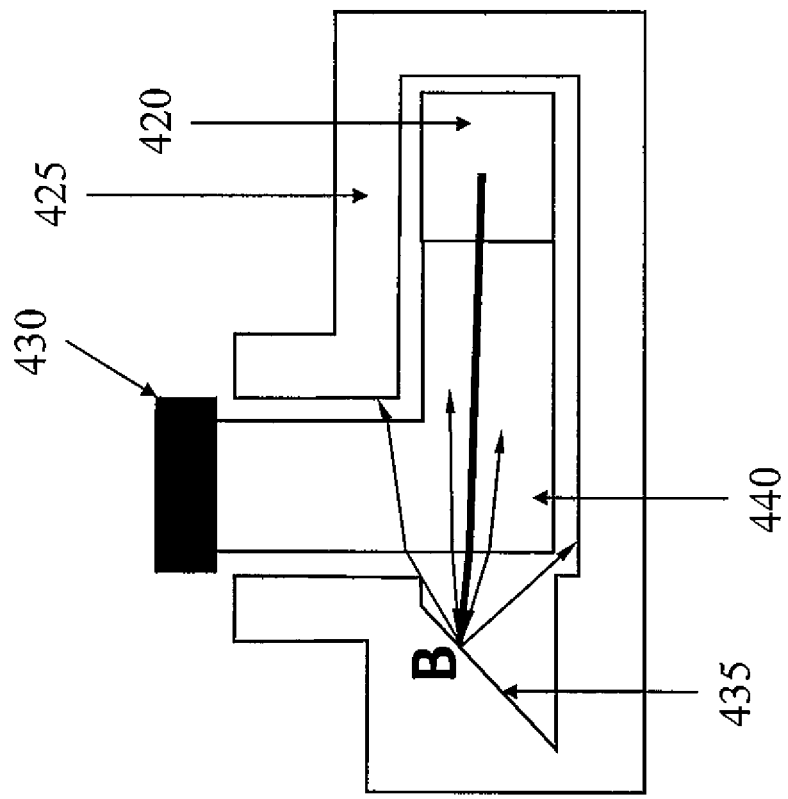
FIG. 4B is a cross-sectional view of a crystal-link-payload assembly surrounded by a tightly-fitting clamshell structure in which an extra space has been created such that light reflected or scattered inside the extra space cannot reach the payload.
Figure 4A:
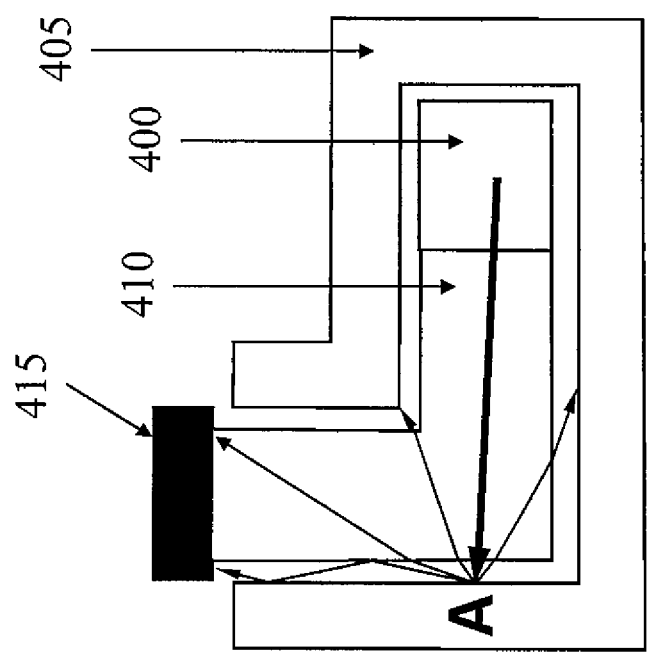
FIG. 4A is a cross-sectional view of a crystal-link-payload assembly surrounded by a tightly-fitting clamshell structure.

FIG. 4A is a cross-sectional view of a crystal-link-payload assembly surrounded by a tightly-fitting clamshell structure. FIG. 4B is a cross-sectional view of a crystal-link-payload assembly surrounded by a tightly-fitting clamshell structure in which an extra space has been created such that light reflected or scattered inside the extra space cannot reach the payload. Further, FIG. 4A is a cross-sectional view of a laser cooling crystal 400 and an internally coated vacuum chamber 405 according to an embodiment of the present invention, and FIG. 4B is a cross-sectional view of a laser cooling crystal 420 and an internally coated chamber 425 according to another embodiment of the present invention.

For example, tightly-fitting may refer to a situation in which the clamshell structure is close (e.g., within about 1 mm) to the crystal-link-payload assembly, but does not touch the crystal-link-payload assembly.

Referring to FIG. 4A, a solid-state optical refrigerator according to embodiments of the present invention may include a laser cooling crystal 400, a thermal link 410, and a vacuum chamber 405. The thermal link 410 may be coupled between the laser cooling crystal 400 and a payload 415. The laser cooling crystal, the thermal link, and a payload may be housed in the vacuum chamber 405. The thermal link according to the embodiments of FIGS. 4A and 4B may be a single-kink thermal link.

According to the embodiment in FIG. 4A, when light fluoresces from the laser cooling crystal 400, some of the light enters the thermal link 410, and some of that light emerges from the thermal link 410 and is incident on the vacuum chamber wall, for example at location "A". The internal wall of the vacuum chamber is preferably coated with a material that absorbs the fluorescence and residual laser light and has low emissivity. A residual amount of the light incident on the vacuum chamber walls may be reflected or scattered off the vacuum chamber wall. As can be seen in FIG. 4A, some of the reflected or scattered light may be incident upon the payload 415. This may cause undesired heating of the payload.

According to the embodiment in FIG. 4B, the internal wall of the vacuum chamber has a slanted shape 435 such that substantially none (e.g., none) of the residual light reflected or scattered off the vacuum chamber wall (for example at location "B") may be incident upon the payload 430. This may prevent or substantially prevent heating of the payload from the reflected or scattered light.

The crystal-link-payload assembly may be enveloped by a closely fitting vacuum chamber so as to reduce (e.g., minimize) the radiative heat load from the warm chamber walls onto the cold crystal-link-payload assembly (see FIG. 4A). Some embodiments of the present invention may include extra space in the area where the thermal link makes its first kink (see FIG. 4B) and where most of the light emerges from the thermal link.

The extra space indicated in FIG. 4B and described above may have other shapes of the chamber wall. Alternatively, an aperture protruding though the wall of the vacuum chamber at location "B" where the thermal link has a kink 440 (e.g., makes its first kink) may be provided for the light emerging from the thermal link to escape the clamshell vacuum chamber altogether.

In FIG. 4A, intense fluorescence or residual laser light may hit the chamber wall immediately past the kink 440 where it is not only absorbed but also scatters. The scattered light may proceed further towards the payload 415 and induce unwanted heating. In FIG. 4B, an aperture is created in this location through which the intense fluorescence can pass to be absorbed at a surface (potentially at an angle) at which reflected or scattered light cannot reach the payload 430. As such, according to the embodiment of FIG. 4B, the amount of fluorescence reaching the payload may be greatly reduced. It may even be possible to use a thermal link with only one kink 440, which has the advantage of having a smaller surface area and thus would be exposed to a smaller radiative heat load compared to a double-kink thermal link, leaving more cooling power for refrigerating the payload.

Figure 5B:
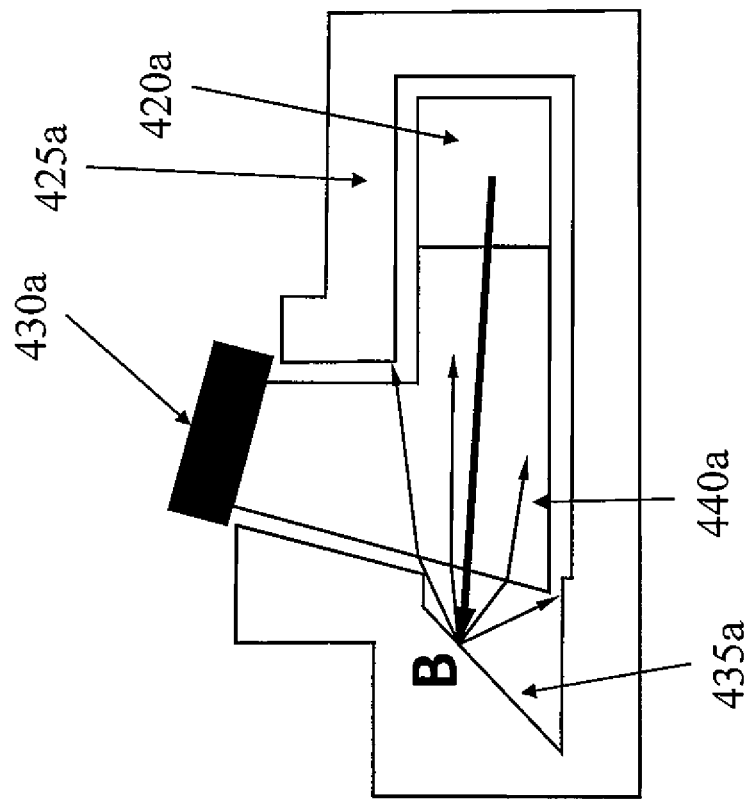
FIG. 5B is a cross-sectional view of a crystal-link-payload assembly surrounded by a tightly-fitting clamshell structure in which an extra space has been created such that light reflected or scattered inside the extra space cannot reach the payload.
Figure 5A:
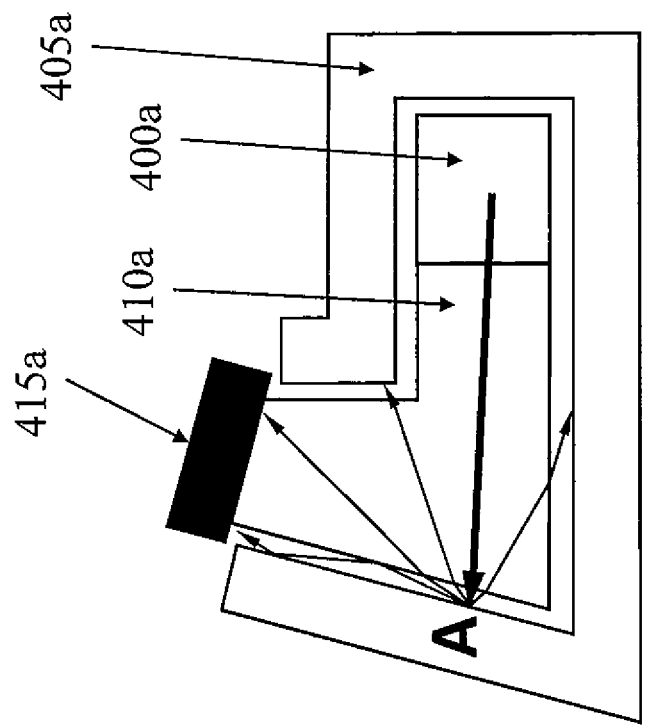
FIG. 5A is a cross-sectional view of a crystal-link-payload assembly surrounded by a tightly-fitting clamshell structure.

FIG. 5A is a cross-sectional view of a crystal-link-payload assembly surrounded by a tightly-fitting clamshell structure. FIG. 5B is a cross-sectional view of a crystal-link-payload assembly surrounded by a tightly-fitting clamshell structure in which an extra space has been created such that light reflected or scattered inside the extra space cannot reach the payload. Further, FIG. 5A is a cross-sectional view of a laser cooling crystal 400a and an internally coated vacuum chamber 405a according to an embodiment of the present invention, and FIG. 5B is a cross-sectional view of a laser cooling crystal 420a and an internally coated chamber 425a according to another embodiment of the present invention.

Referring to FIG. 5A, a solid-state optical refrigerator according to embodiments of the present invention may include a laser cooling crystal 400a, a thermal link 410a, and a vacuum chamber 405a. The thermal link 410a may be coupled between the laser cooling crystal 400a and a payload 415a. The laser cooling crystal, the thermal link, and a payload may be housed in the vacuum chamber 405a. The thermal link according to the embodiments of FIGS. 5A and 5B may be a single-kink thermal link.

According to the embodiment in FIG. 5A, when light fluoresces from the laser cooling crystal 400a, some of the light enters the thermal link 410a, and some of that light emerges from the thermal link 410a and is incident on the vacuum chamber wall, for example at location "A". The internal wall of the vacuum chamber is preferably coated with a material that absorbs the fluorescence and residual laser light and has low emissivity. A residual amount of the light incident on the vacuum chamber walls may be reflected or scattered off the vacuum chamber wall. As can be seen in FIG. 5A, some of the reflected or scattered light may be incident upon the payload 415a. This may cause undesired heating of the payload.

According to the embodiment in FIG. 5B, the internal wall of the vacuum chamber has a slanted shape 435a such that substantially none (e.g., none) of the residual light reflected or scattered off the vacuum chamber wall (for example at location "B") may be incident upon the payload 430a. This may prevent or substantially prevent heating of the payload from the reflected or scattered light.

The embodiments of FIGS. 5A and 5B are similar to the embodiments of FIGS. 4A and 4B except that in FIGS. 4A and 4B the single kink 440a is bent at 90° and in the embodiments of FIGS. 5A and 5B the single kink 440a is bent at an angle other than 90° (e.g., less than 90°, greater than 90°, 75°, 105°, etc.). Description of features of FIGS. 5A and 5B that are similar to features of FIGS. 4A and 4B may be omitted herein. The embodiment of FIG. 5B may more effectively prevent the residual light reflected or scattered off the vacuum chamber wall (for example at location "B") from being incident upon the payload than the embodiment of FIG. 4B.

Figure 6B:
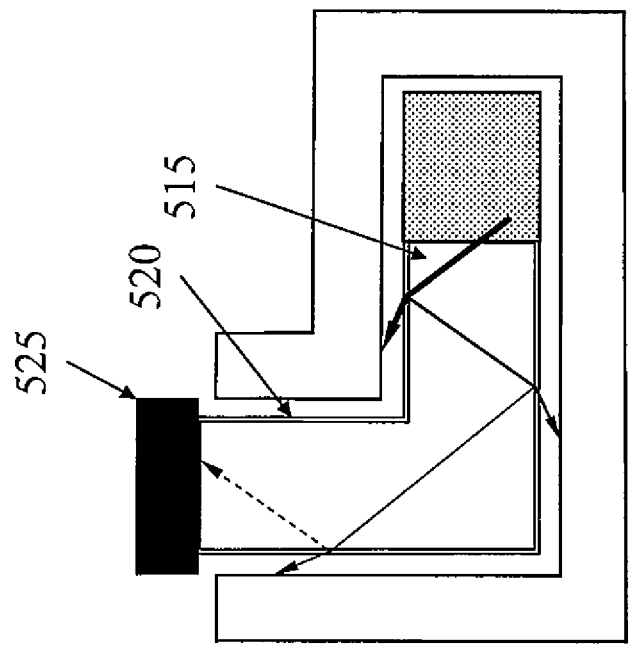
FIG. 6B is a cross-sectional view of a crystal-link-payload assembly in which the surfaces of the thermal link have been nano-textured such as to achieve anti-reflection properties and thereby suppress total internal reflection.
Figure 6A:
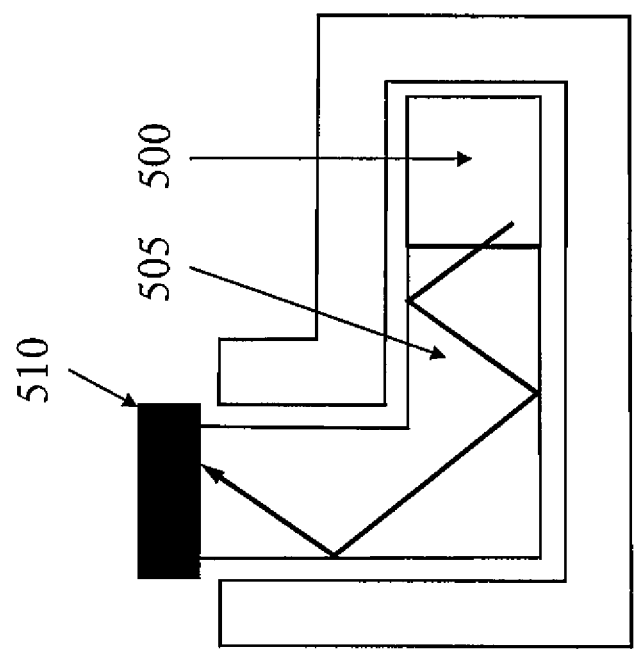
FIG. 6A is a cross-sectional view of a crystal-link-payload assembly showing how total internal reflection may allow certain light rays to reach the payload despite the presence of a kink in the thermal link.

FIG. 6A is a cross-sectional view of a crystal-link-payload assembly showing how total internal reflection may allow certain light rays to reach the payload despite the presence of a kink in the thermal link. FIG. 6B is a cross-sectional view of a crystal-link-payload assembly in which the surfaces of the thermal link have been nano-textured such as to achieve anti-reflection properties and thereby suppress total internal reflection.

FIG. 6A illustrates that, despite the presence of a kink in the thermal link 505, some fluorescence or residual laser light originating in the cooling crystal 500 and propagating in the thermal link 505 may reach payload 510 via total internal reflection. This may cause undesired heating of the payload.

The thermal link surfaces and/or some of the laser-cooling crystal surfaces may use nano-texturing in order to reduce the trapping of fluorescence or residual laser light within the thermal link by total internal reflection. A surface textured on the nanometer scale may provide anti-reflection properties over wide ranges of angles of incidence and wavelengths as the ensemble of sub-wavelength structures acts as a graded index interface that minimizes the magnitude of the light reflected at the interface.

According to one embodiment of the present invention and as illustrated in FIG. 6B, a thermal link 515 comprising nano-textured surfaces 520 may allow light that propagates inside the thermal link (fluorescence light and residual laser light; incident on the surfaces at a wide range of angles) to readily escape the link upon encountering the first link surface. The magnitude of light reflected by total internal reflection is greatly reduced upon each subsequent encounter with a nano-textured surface, thereby greatly reducing the amount of light reaching the payload 525. That is, most light propagating within the thermal link 515 will emerge from the thermal link in the first link segment and the first link kink, and the escaped light may be absorbed by the coated chamber walls at that location. This may greatly suppress optical trapping of light by total internal reflection in the thermal link, i.e. may prevent some of the light from making it around the first (or subsequent) kinks and prevent the light from reaching (and heating) the payload.

The use of nano-textured link surfaces may improve the prevention of light from reaching the payload, and may allow the use of smaller (e.g. single-kink) thermal links that have a lower radiative heat load, leaving more cooling power for refrigerating the payload.

Nano-textured surfaces may also be created on the surfaces of the cooling crystal. This may reduce trapping of fluorescence inside the crystal, thereby increasing the light extraction efficiency and thus increasing the cooling efficiency. Likewise, nano-texturing of the crystal surfaces that are in the path of the pump laser may reduce reflection losses, thereby increasing the absorbed power and thus increasing the cooling power.

Figure 7A:
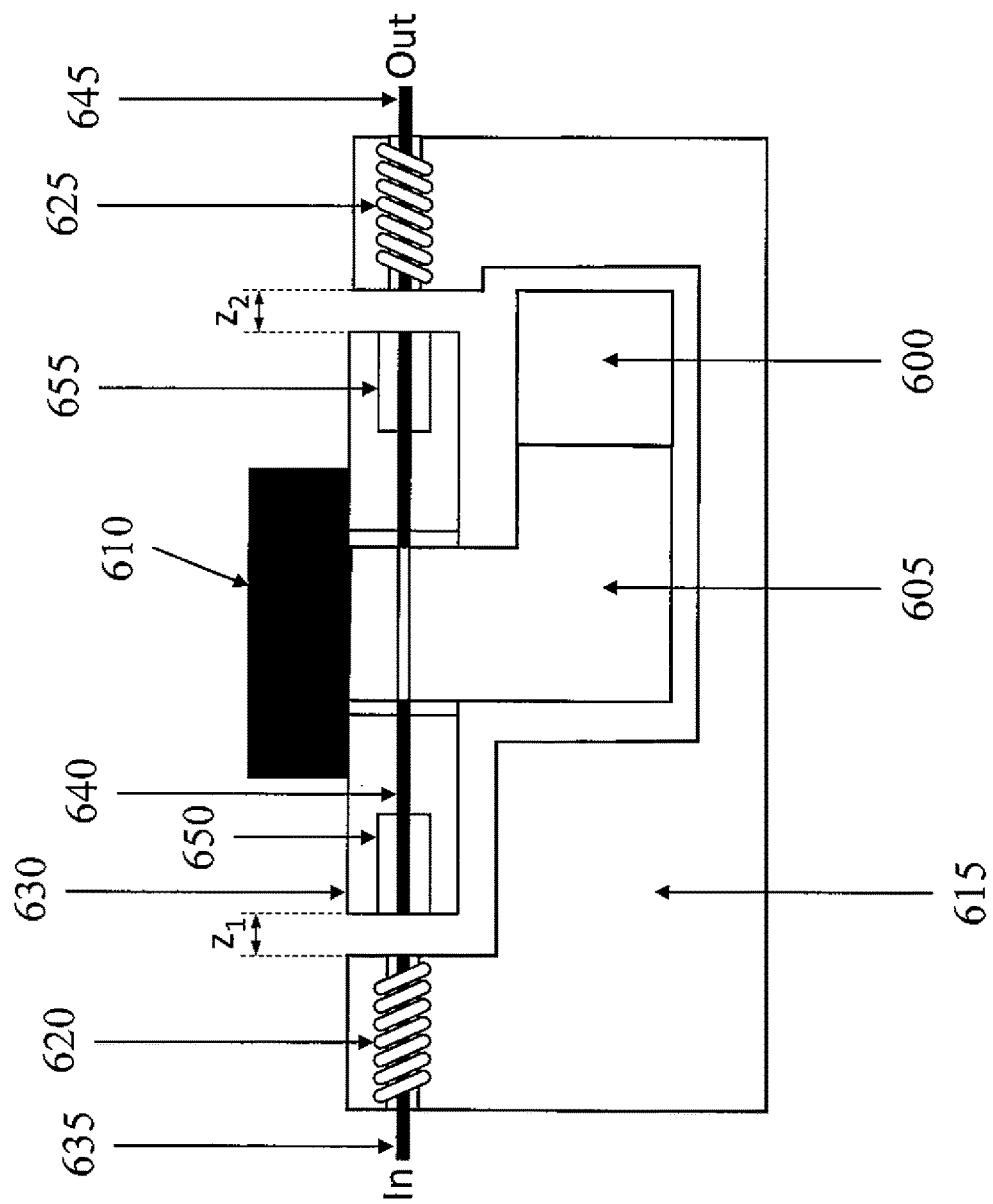
FIG. 7A is a cross-sectional view of a mounting of the crystal-link-payload assembly using magnetic levitation and centering according to an embodiment of the present invention.
Figure 7B:
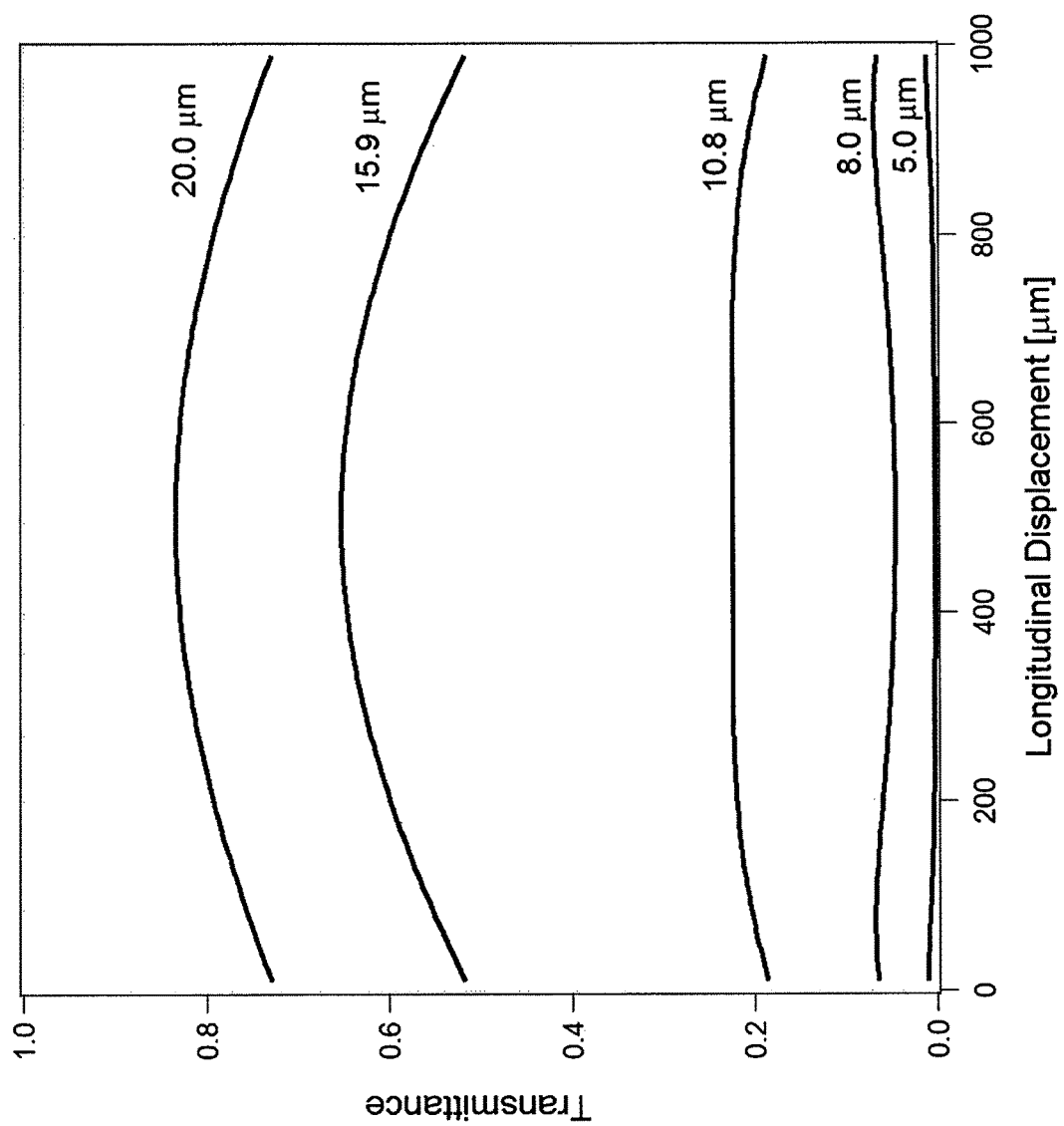
FIG. 7B is a graph of optical transmittance through a photonic crystal (PC) fiber structure as a function of the longitudinal displacement ($z_1$) according to an embodiment of the present invention.

FIG. 7A is a cross-sectional view of a mounting of the crystal-link-payload assembly using magnetic levitation and centering according to an embodiment of the present invention. FIG. 7B is a graph of optical transmittance through a photonic crystal (PC) fiber structure as a function of the longitudinal displacement ($z_1$) for optical fibers having different mode-field diameters, according to an embodiment of the present invention. In this example, $z_1+z_2=1000$ µm and the wavelength of the light is 1.55 µm.

Referring to FIG. 7A, according to embodiments of the present invention, the assembly consisting of crystal 600, thermal link 605, and payload 610 may be magnetically levitated inside the clamshell structure 615 by two pairs of coils arranged perpendicularly in a plane. FIG. 7A shows the first pair of coils 620 and 625 arranged along one axis; the second pair of coils is not shown and may be perpendicular to the first pair of coils. The crystal-link-payload assembly may protrude through an aperture in and may be mounted to a magnetic levitation sub-mount 630. Laser light may be injected into a first optical fiber 635, may shine across gap $z_1$, may be coupled into a second optical fiber 640, may shine across gap $z_2$, and may be coupled into a third optical fiber 645. The amount of light transmitted through the three fiber sections from the input "In" to the output "Out" (i.e. the transmittance) is a function of the longitudinal displacement ($z_1$ and $z_2$) of the magnetic levitation sub-mount 630.

In FIG. 7A, the magnetic levitation sub-mount 630 may include the optical fiber 640 and the magnetic pins 650 and 655. The magnetic levitation sub-mount 630 may act as a platform for (1) attaching the crystal-link-payload assembly, (2) holding the optical fiber, and (3) holding magnetic pins (e.g., metal pins). The magnetic pins (or metal pins) may be made from ferromagnetic materials such that they can be attracted towards the coils when the coils are energized.

Referring to FIG. 7B, for sufficiently large mode-field diameters of the optical fiber, the transmittance is maximum if $z_1=z_2$, i.e. the magnetic levitation sub-mount 630 is centered in the gap.

Applying an electrical current to coil 620 creates a magnetic field that attracts metal pin 650 that is embedded in the magnetic levitation sub-mount 630. Applying an electrical current to coil 625 creates a magnetic field that attracts metal pin 655 that is embedded in the magnetic levitation sub-mount 630. Therefore, coils 620 and 625 may provide active stabilization and alignment of the assembly (including the magnetic mount) in the longitudinal direction by means of varying the magnetic field strength via the electrical current applied through the coils. The current is applied to the coil such that the amount of light transmitted through the three fiber sections from the input "In" to the output "Out" is maximized. This may be implemented as feedback control loop such that active stabilization is achieved. A similar active magnetic levitation control system is implemented perpendicular to the one shown in FIG. 7A in order to achieve active 2-axis positioning of the levitated assembly.

Referring to FIG. 7B, an optical fiber with a sufficiently large mode-field diameter may be used such that the transmittance through the fiber sections is at a maximum for $z_1=z_2$ and stable active levitation control is possible. For this example, a maximum exists for mode-field diameters exceeding ~11 µm. Photonic crystal (PC) fiber may be particularly suited for this application as they can provide large-mode field diameters and single-mode operation.

Magnetic levitation of the crystal-link-payload assembly, as described above, may replace a mechanical support structure and therefore eliminate any conductive heat transfer from the warm clamshell walls to the colder crystal-link-payload assembly, leaving more cooling power for refrigerating the payload. Magnetic levitation therefore also eliminates mechanical failures associated with support structures exposed to mechanical vibrations or shock.

The assembly, according to embodiments of the present invention, may be locked down during a rocket launch when the greatest stresses occur, and the assembly may be actively levitated as the optical refrigerator begins operation in orbit.

As such, embodiments of the present invention may provide a mechanism to reliably connect a payload to the laser cooling crystal with good thermal conductivity while rejecting fluorescence and provide a mechanism of rigidly mounting the crystal-link-payload assembly while reducing (e.g., minimizing) parasitic heat loads. As such, embodiments of the present invention may make solid-state optical refrigeration practical for various applications.

Embodiments of the present invention may be used as a solid-state optical refrigerator in the cryogenic cooling of sensors for space application. Embodiments of the present invention may provide vibration-free cooling (e.g., no moving parts), may be tuned via the pump laser power to varying mission requirements (full, intermediate, or no cooling), and may be constructed from components that have an intrinsically high reliability.

While embodiments of the present invention and the figures herein show the payload (e.g., 320, 415, 430, 415a, 430a, 510, 525, and 610) directly adjacent to or touching the thermal link (e.g., 315, 410, 410a, 505, and 605), the present invention is not limited thereto. For example, the payload and the thermal link may be in thermal contact via a third element (e.g., a transition piece) between the thermal link and the payload.

It will be understood that, although the terms "first," "second," "third," etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the spirit and scope of the present invention.

It will be understood that when an element or layer is referred to as being "on," "connected to," "coupled to," "connected with," "coupled with," or "adjacent to" another element or layer, it can be "directly on," "directly connected to," "directly coupled to," "directly connected with," "directly coupled with," or "directly adjacent to" the other element or layer, or one or more intervening elements or layers may be present. Furthermore, "connection," "connected," etc., may also refer to "electrical connection," "electrically connected," etc., depending on the context in which such terms are used as would be understood by those skilled in the art. When an element or layer is referred to as being "directly on," "directly connected to," "directly coupled to," "directly connected with," "directly coupled with," or "immediately adjacent to" another element or layer, there are no intervening elements or layers present.

Further, it will also be understood that when one element, component, region, layer, and/or section is referred to as being "between" two elements, components, regions, layers, and/or sections, it can be the only element, component, region, layer, and/or section between the two elements, components, regions, layers, and/or sections, or one or more intervening elements, components, regions, layers, and/or sections may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprise," "comprises," "comprising," "includes," "including," and "include," when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. Further, the use of "may" when describing embodiments of the present invention refers to "one or more embodiments of the present invention."

As used herein, "substantially," "about," and similar terms are used as terms of approximation and not as terms of degree, and are intended to account for the inherent deviations in measured or calculated values that would be recognized by those of ordinary skill in the art.

As used herein, the terms "use," "using," and "used" may be considered synonymous with the terms "utilize," "utilizing," and "utilized," respectively.

Features described in relation to one or more embodiments of the present invention are available for use in conjunction with features of other embodiments of the present invention. For example, features described in a first embodiment may be combined with features described in a second embodiment to form a third embodiment, even though the third embodiment may not be specifically described herein.

Also, any numerical range recited herein is intended to include all sub-ranges of the same numerical precision subsumed within the recited range. For example, a range of "1.0 to 10.0" or between "1.0 and 10.0" IS intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112, first paragraph, and 35 U.S.C. § 132(a).

Although this invention has been described with regard to certain specific embodiments, those skilled in the art will have no difficulty devising variations of the described embodiments, which in no way depart from the scope and spirit of the present invention. Furthermore, to those skilled in the various arts, the invention itself described herein will suggest solutions to other tasks and adaptations for other applications. It is the Applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents.

What is claimed is:

1. A solid-state optical refrigerator for cryogenic cooling of a payload, the solid-state optical refrigerator comprising:
   a laser cooling crystal comprising a first material and a dopant material;
   a thermal link comprising a second material and having a first kink, the thermal link being bonded to the laser cooling crystal and the thermal link being configured to be thermally linked to the payload to transfer heat conductively from the payload to the laser cooling crystal via the thermal link; and
   a vacuum chamber housing the laser cooling crystal and the thermal link, the vacuum chamber and thermal link having a combination of shape and coating such that laser and fluorescence light reflected off a wall of the vacuum chamber and laser and fluorescence light propagating within the thermal link are not incident on the payload, the vacuum chamber comprising a slanted wall configured to intersect a propagation path of laser and fluorescence light that emerges from the thermal link at the first kink.

2. The solid-state optical refrigerator of claim 1,
wherein the first material comprises a YLiF$_4$ (YLF) host crystal, and
wherein the dopant material comprises Yb$^{3+}$ ions in a concentration such that 10% of Y$^{3+}$ ions in the YLF host crystal have been replaced with the Yb$^{3+}$ ions.

3. The solid-state optical refrigerator of claim 1, further comprising:
aerogel pieces between the vacuum chamber and the thermal link,
wherein the aerogel pieces comprise:
a six-point aerogel support structure comprising three pairs of aerogel cylinders configured to pressurize the laser cooling crystal, the thermal link, and the payload in a first direction, a second direction, and a third direction, respectively, the first, second, and third directions crossing each other, or
a three-point aerogel support structure comprising an aerogel corner support and an aerogel edge support, the aerogel corner support and the aerogel edge support configured to mount the laser cooling crystal, the thermal link, and the payload inside the vacuum chamber, wherein the aerogel corner support is mounted to a corner of the thermal link formed at the first kink.

4. The solid-state optical refrigerator of claim 3, wherein the aerogel pieces are hydrophobic.

5. The solid-state optical refrigerator of claim 1, wherein the thermal link is a double-kink thermal link having the first kink and a second kink,
wherein the first kink is spaced apart from the second kink,
an extension direction of the first kink crosses an extension direction of the second kink, and
the slanted wall forms a surface of an indent in the vacuum chamber, the indent being configured to receive the laser and fluorescence light that emerges from the thermal link at the first kink.

6. The solid-state optical refrigerator of claim 5, wherein at least one selected from the first kink and the second kink has a kink angle of less than 90°.

7. The solid-state optical refrigerator of claim 1, wherein the laser cooling crystal and the thermal link have substantially the same coefficient of thermal expansion.

8. The solid-state optical refrigerator of claim 1, further comprising a magnetic mount for actively stabilizing and aligning the payload, the laser cooling crystal, the thermal link, and the magnetic mount.

9. The solid-state optical refrigerator of claim 8, wherein the magnetic mount comprises:
a submount;
optical fibers;
coils; and
magnetic pins,
wherein the coils are configured to be energized by an electric current, and
the magnetic pins are configured to be attracted towards the coils when the coils are energized.

10. The solid-state optical refrigerator of claim 1, wherein the thermal link has nano-textured surfaces.

11. The solid-state optical refrigerator of claim 10,
wherein the first material comprises a YLiF$_4$ (YLF) host crystal, and
wherein the dopant material comprises Yb$^{3+}$ ions in a concentration such that 10% of Y$^{3+}$ ions in the YLF host crystal have been replaced with the Yb$^{3+}$ ions.

12. The solid-state optical refrigerator of claim 10, further comprising:
aerogel pieces between the vacuum chamber and the thermal link.

13. The solid-state optical refrigerator of claim 12, wherein the aerogel pieces are hydrophobic.

14. The solid-state optical refrigerator of claim 10, wherein the thermal link is a single kink thermal link.

15. The solid-state optical refrigerator of claim 14, wherein the single kink thermal link has a kink angle of less than 90°.

16. The solid-state optical refrigerator of claim 10, wherein the laser cooling crystal and the thermal link have substantially the same coefficient of thermal expansion.

17. The solid-state optical refrigerator of claim 10, further comprising a magnetic mount for actively stabilizing and aligning the payload, the laser cooling crystal, the thermal link, and the magnetic mount.

18. The solid-state optical refrigerator of claim 17, wherein the magnetic mount comprises:
a submount;
optical fibers; and
magnetic pins.

19. A method of cryogenically cooling a payload, the method comprising:
providing a laser cooling crystal comprising a first material and a dopant material;
bonding a thermal link to the laser cooling crystal, the thermal link comprising a second material and having a first kink;
housing the laser cooling crystal and the thermal link in a vacuum chamber; and
exciting the laser cooling crystal with laser light of a first wavelength,
wherein the thermal link is thermally linked to the payload and transfers heat conductively from the payload to the laser cooling crystal, and
wherein the vacuum chamber and thermal link have a combination of shape and coating such that the laser light and fluorescence light reflected off a wall of the vacuum chamber and the laser light and fluorescence light propagating within the thermal link are not incident on the payload, the vacuum chamber comprising an indent configured to receive the laser light and the fluorescence light that emerges from the thermal link at the first kink.

20. The method of claim 19,
wherein the first material comprises a YLiF$_4$ (YLF) host crystal, and
wherein the dopant material comprises Yb$^{3+}$ ions in a concentration such that 10% of Y$^{3+}$ ions in the YLF host crystal have been replaced with the Yb$^{3+}$ ions.

* * * * *